United States Patent [15] 3,690,158
Lichtenstein et al. [45] Sept. 12, 1972

[54] MEANS AND METHOD FOR DETECTION OF GLAUCOMA

[72] Inventors: Bernard Lichtenstein, 1825 Highbrook St., Yorktown Heights, N.Y. 10578; Bruce G. Kroger, Purchase St., Rye, N.Y. 10580

[22] Filed: May 6, 1970

[21] Appl. No.: 34,952

Related U.S. Application Data

[62] Division of Ser. No. 679,379, Oct. 31, 1967, Pat. No. 3,545,260.

[52] U.S. Cl. ................................73/80, 73/67.8
[51] Int. Cl. ..........................G01n 29/00, A61b 3/16
[58] Field of Search .............73/67.1, 67.8, 80; 128/2

[56] References Cited

UNITED STATES PATENTS 2,394,461   2/1946   Mason ........................73/67.1
2,618,968   11/1952  McConnell .............73/67.8 X
3,371,660   3/1968   Carlin ...........................128/2

OTHER PUBLICATIONS

Mundt et al " Ultrasonics in Ocular Diagnosis" - American Journal of Opthalmology -- Vol. 41, No. 3, March 1956, 488-98. RE 1 A5 in Library – Copy in 73/80.

Primary Examiner—Richard C. Queisser
Assistant Examiner—C. E. Snee, III
Attorney—S. P. Tedesco and S. E. Rockwell

[57] ABSTRACT

The acoustic impedance of the cornea is measured by comparing the energy it reflects with the energy reflected by a calibrated, variable impedance member.

2 Claims, 1 Drawing Figure

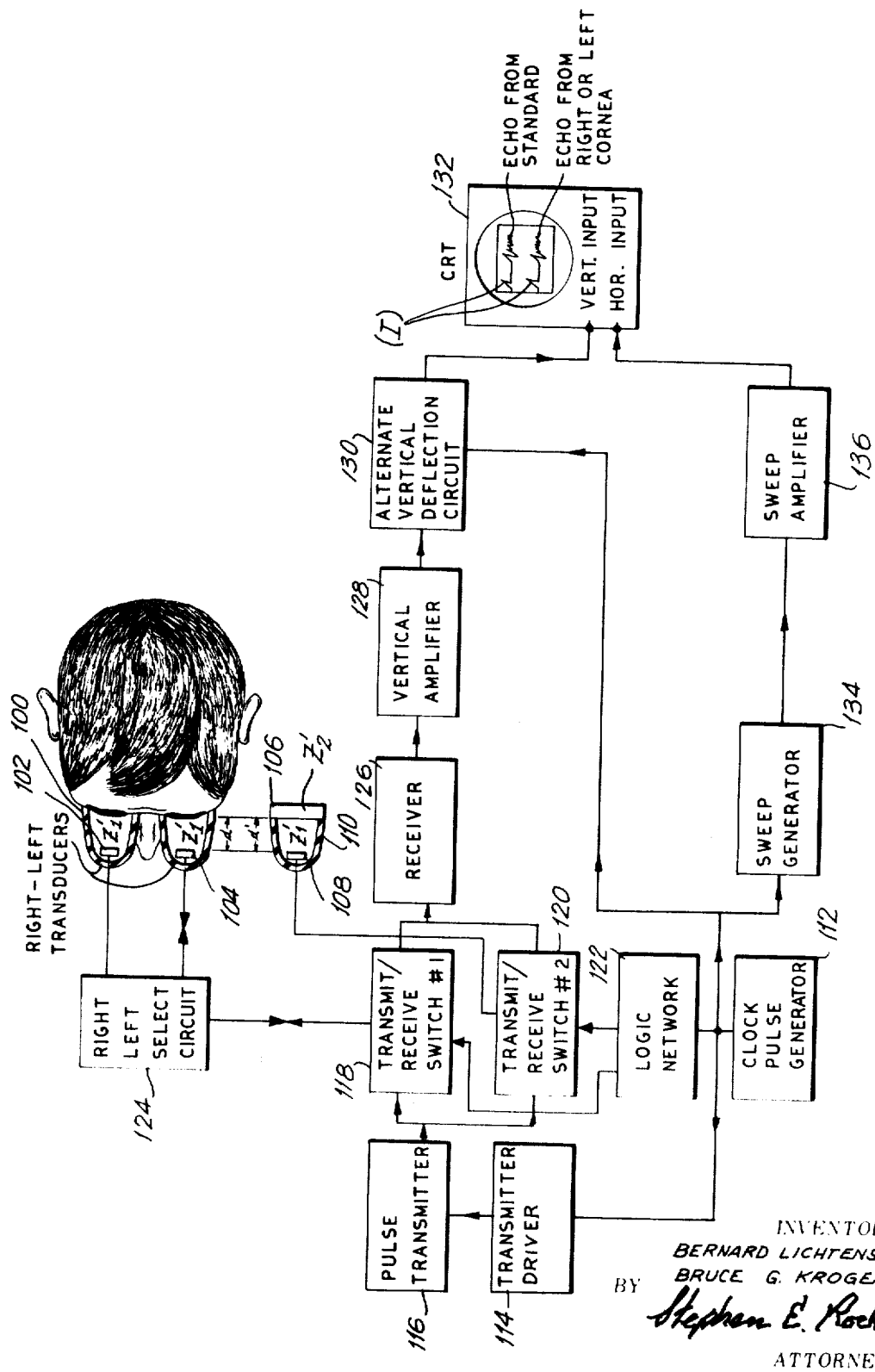

MEANS AND METHOD FOR DETECTION OF GLAUCOMA

This patent application is related as a divisional application to U.S. Pat. application Ser. No. 679,379, filed on Oct. 31, 1967 (now U.S. Pat. No. 3,545,260).

BACKGROUND OF THE INVENTION

1. Field of the Invention

This invention relates to the measurement of pressure within a closed container, and particularly to the measurement of pressure within an invertebrate eye.

2. Description of the Prior Art

The determination of the liquid pressure in the anterior eye chamber (intraocular pressure) is of great interest in the diagnosis of glaucoma. While the causes of glaucoma are not completely understood, its diagnosis and treatment are fairly well understood. Glaucoma is a malfunction of the eye mechanism which results in impairment of the circulation of the aqueous humor through the eye, and thereby leads to a build-up of liquid pressure within the eye. This pressure build-up, if permitted to persist, can damage the optic cup and the retina, eventuating in blindness.

The relationship between the pressures in the normal and in the glaucomatous eye has been known since 1830. The formation of the aqueous humor and its circulation within the eye was subsequently theorized and proven in 1837 by the injection of a dilute dye into the anterior chamber of the eye and then noting the presence of this dye in the episcleral vessels.

Various methods and apparatuses have been developed to accomplish "tonometry" or "the observation and the recording of pressure changes in any physical or biological system," as discussed by P.C. Kronfield in Transactions of the American Academy of Ophtalmology and Otolaryngology, 133:Mar/April 1961 Subsequently the "massage effect" was discovered, wherein external pressure applied to the eye causes a drop in intraocular pressure. J. S. Friedenwald in I, Am. J. Ophtalmology 20:985 1937; II, ibid, 22:375, 1939, published a table relating the volume of corneal indentation and intraocular pressure to the plunger loads and scale readings of the "Schiotz" tonometer. There are several types of tonometers in common use. They are the Schiotz, the Gradle, the McLean, the Bailliort, the Sunter and the Harrington. All except the Bailliort are used in a similar manner in that the tonometer is hand supported and the footplate, which is weighted, is allowed to contact the cornea. The Bailliort tonometer footplate contacts the temporal sclera about 5mm. from the limbus, instead of the cornea. In use, contact is made to correspond to an initial Schiotz scale reading and the subsequent fall of the plunger is followed by the pivoted lever and measured by the deflection of the lever against an upper scale. During this measurement the subject must be in a reclining position with the cornea anesthetized.

Friedenwald's tables relate the initial tonometer reading to steady state or intraocular pressure ($P_o$) by the following equation:

$$\Delta V = \frac{1}{K_t} \log \frac{P_t}{P_o} \quad (1)$$

where $\Delta V$ is the net ocular displacement; $K_t$ is the coefficient of ocular rigidity with respect to ocular distortion; and $P_t$ is the intraocular pressure as a result of applying the tonometer.

The values of $V$ are determined to be a function of the tonometer depth. $P_t$ is calculated from the calibrated plunger weight and diameter. There is no single intraocular pressure level that demarks a healthy eye from a glaucomatous eye. The normal variations of intraocular pressure are between 16 and 25 mm. Hg. The average intraocular pressure reading taken in 1,000 eyes of patients over 30 years of age was reported as 19,63 mm.Hg. by Berens and Zuckerman in Diagnostic Examination of the Eye, 1946. This changes with age, being lowest between 30 and 40 years, highest between 60 and 70 years, and decreasing after 70. Intraocular pressure above 25 mm. Hg. is considered suspicious, and above 28, pathologic. G. W. Morton demonstrated a method for measuring the "Coefficient of Aqueous Humor Outflow" or (C) in AMA Archives of Ophthalmology 46:113, 1951. This coefficient, with the intraocular pressure, enables the calculation of the total flow of aqueous humor. The assumption is made that the change in ocular volume ($\Delta V$) is equal to the volumes of fluid expressed from the eye, and that the eye acts as a linear mechanical system. Thus, where ($\Delta P$) is the change in pressure during tonometry, as measured by a continuous reading tonometer over a fixed interval of time ($T$), and ($P_o$) is the initial intraocular pressure, then $$\frac{\Delta V}{T} \sim \Delta P$$

or $$\frac{\Delta V}{T} = C \Delta P \quad (2)$$

and $$C = \frac{V}{T(\Delta P)} \quad (3)$$

$C$ being the coefficient of facility of aqueous outflow. Since all terms on the right of equation are measured by the continuous reading tonometer, $C$ can be calculated.

Since Morton's work in 1950, a great many measurements of $C$ have been made which have indicated the diagnostic value of the coefficient of facility of aqueous humor outflow. The glaucomatous eye tends to have a low $C$ and a high $P_o$. Values of $C$ greater than 0.18 are normal, values between 0.13 and 0.18 are suspect, and values less than 0.13 are probable glaucoma. For subjects in the 0.13 to 0.18 range, the ratio of introocular pressure to coefficient of facility of outflow ($P_o/C$) is useful, setting the norm at a value of 100. $P_o/C$ values of greater than 100 are considered normal, and less than 100 are suspect.

Tabulations of $C$ and $P_o$ require a knowledge of the coefficient of ocular rigidity ($K_t$). The values used are empirically determined mean, and can result in errors in $C$ and $P_o$ when eyes with abnormal ocular rigidity are examined. In view of this, it is desirable to measure $P_o$ while introducing a minimum of surface and fluid distortion to the eye. In 1956, H. Goldman devised the Applanation Tonometer, Trans. Ophthal, Soc. U.K. 79:477, 1959, wherein pressure application is carefully controlled and limited to the amount required to just flatten a small surface of the cornea with a 3.06 mm. diameter footplate, which creates approximately a 200 micrometer corneal indentation. Values of $P_o$ obtained this way have proven more reliable, and the combination of values of $P_o$ obtained by applanation, and $C$ obtained by tonography are the most reliable glaucoma diagnostic tools commonly available.

SUMMARY OF THE INVENTION

Objects of this invention are to provide a method and apparatus for tonometry utilizing a scleral distortion much smaller than that previously feasible, e.g., 2.5 micrometer indentation, and to make possible a measurement of $P_0$ with more accuracy and less effect on the eye. Other objects are to provide a technique which does not require a topical anesthetic, nor dyes applied to the eye; to allow measurement in complete comfort to the subject without mechanical contact with the cornea; and to provide a measurement which can be made simply, swiftly, and to both eyes concurrently if desired.

A principle of the invention is a system wherein the acoustic impedance of the eye is measured by ensonifying and comparing the eye acoustic impedance with a known acoustic impedance.

BRIEF DESCRIPTION OF THE DRAWING

These and other objects, features and advantages of the invention will be apparent from the following specification thereof, taken in conjunction with the accompanying drawing, in which:

The FIGURE is a block diagram of an apparatus for measuring the intraocular pressure by measuring the acoustic impedance of the anterior chamber.

DESCRIPTION OF THE PREFERRED EMBODIMENT

Radiated energy, of any type, be it acoustic, ultrasonic, or electromagnetic, will experience reflection and refraction at boundaries of change in the propagating medium. In the case of a propagated acoustic wave, the amount of reflected energy is a function of acoustic impedance mismatch at the boundary. The relative intensity of reflected to propagated energy for normal incidence is defined by:

$$I_r = \left[\frac{Z_1 - Z_2}{Z_1 + Z_2}\right]^2$$

Where, $I_r$ = intensity reflection coefficient,
$Z_1$ = Acoustic impedance of propogation source,
$Z_2$ = Acoustic impedance of propogation incidence.

Echo intensity is also a function of the angle of the incident energy with respect to the incident boundary and the distance from the transducer to that boundary. The echo intensity is very sensitive to the angle of incidence, changing as much as 40 percent for a 1° inclination change at 18 mcs. Changing the transducer-to-boundary spacing by three wavelengths at 18 mcs. can produce a 20 percent variation.

If the spacing is held constant and the angle of incidence is carefully controlled, then the coefficient of reflection varies in response to the acoustic mismatch. Then, if the acoustic impedance of a first medium is known, the acoustic impedance of a second medium can be determined.

It appears that the intraocular pressure of the eye is responsive to the acoustic impedance of the cornea, and this relationship is constant. A system for measuring the acoustic impedance of the cornea is shown in the FIG. 1. In this system the eye is ensonified by bursts of high frequency acoustic energy and the echo level is visually displayed in the face of the cathode ray tube. Simultaneously, the same energy is used to ensonify, through a like interface material, a material whose acoustic impedance $Z'_2$ is calibrated. The second echo so produced is displayed above the first echo on the same tube face. By selecting the calibrated impedance $Z'_2$ until the echo intensities are equal, a value of energy is reflected which is equal to that of the ensonified portion of the eye. To effect such selection, a number of containers, such as 106-110 and each including a transducer 108, are operatively substituted, in turn, into the system, so as to be connected to the transmit-receive switch 120 by an appropriate switching arrangement, not shown. The containers 106 of such arrangements include different calibrated acoustic impedances, $Z'_2$ which are used as standards for purposes of comparison to determine the acoustical impedance of the cornea.

The subject disposes his eye in a container 100 so that the distance d of the cornea from the right transducer 102 and the left transducer 104 is equal to the distance $d'$ of a body 106, whose acoustic impedance is calibrated, from a transducer 108 in a container 110. Both of the containers are filled with a fluid whose acoustic impedance approximates that of the eye.

A clock pulse generator 112 generates a fixed sequence of pulses which form the time base for the system. Each clock pulse enables a transmitter driver 114 which drives a pulse transmitter to feed a high frequency pulse to two transmit-receive switches 118 and 120. The clock pulses from the generator 112 are also coupled to a logic network 122 which alternately enables switch 118 and switch 120. Switch 118, when enabled, transmits the high frequency transmitter pulses to either the right or left transducers 102 or 104, as determined by a right or left select circuit 124, which propagates the energy through the medium having an acoustic impedance $Z'_1$ contained in the container 100 to the respective right or left cornea. The echo returns through the same transducer to the switch 118, which is held on by the logic network 122. The echo is coupled through a receiver 126, amplified in a vertical amplifier 128, and coupled by an alternate vertical deflection circuit 130 to the vertical input of the CRT 132 and displayed as a lower trace. The same clock pulse from the generator 112, which initiated this sequence, turns on a sweep generator 134, which starts the CRT horizontal trace via the sweep amplifier 136 which is coupled to the horizontal input of the CRT. The initial pulse (I) displayed in the CRT is part of the transmit pulse which feeds through the receiver chain. The subsequent pulse (E) is the echo pulse. The sequence is repeated for the next clock pulse from the generator 112 which causes the logic network 122 to turn on the transmit-receive switch 120. This couples the high frequency pulse from the transmitter 116 to the transducer 108 disposed in the standard container 110 which is also filled with a medium which is substantially the same as $Z'_1$. The burst of energy is reflected from the body 106, and this echo is coupled through the receiver 126, the amplifier 128 and the alternate vertical deflection circuit to the vertical input of the CRT, and displayed as an upper trace. The traces are alternated as described by the alternate deflection circuit which adds a voltage increment to the pulses from the switch 120.

The impedance $Z'_2$ of the body 106 is selected such that the echo intensities are matched, thereby providing a known value of $Z'_2$ equal to the ensonified portion of the eye.

When the acoustic impedance of the interface material $Z_1$, such as water or light oil, is closely matched to the acoustic impedance of the eye, the coefficient of reflection intensity ($I_r$) is very sensitive to changes in the acoustic impedance of the eye ($Z_2$), Thus, $$\frac{I_{rn}}{I_{rg}} = \frac{\left[\frac{Z_1-Z_n}{Z_1+Z_n}\right]^2}{\left[\frac{Z_1-Z_g}{Z_1+Z_g}\right]^2}$$

Where, $I_{rn}$ = Intensity of reflection coefficient for a normal eye;
$I_{rg}$ = Intensity of reflection coefficient for a glaucomatous eye;
$Z_1$ = Acoustic impedance of the interfaces material;
$Z_n$ = Acoustic impedance of the normal eye,
$Z_g$ = Acoustic impedance of the glaucomatous eye.
By letting $A = Z_g/Z_n$, $B = I_{rn}/I_{rg}$, $D = Z_1/Zn$, Thus, $$B = \left[\frac{D-1}{D\pm 1}\right]^2 \times \left[\frac{D\pm A}{D-A}\right]^2$$

which, when plotted, letting said B be the variable, provides a family of curves as a function of D. In these curves, the ratio of coefficient of reflection changes very rapidly for small changes in acoustic impedance of the eye when the initial impedance match is close to 1. This sensitivity descreases as the initial acoustic impedance match is degraded, e.g., D becomes smaller. When the initial acoustic impedance ratio is 0.9, a coefficient of intensity of reflection ratio of 0.5 is obtained by the impedance ratio A changing approximately 0.05. Thus, a 5 percent change in corneal acoustic impedance between a normal eye and a glaucomatous eye will result in a 6 db change in reflected energy. This level change is a good minimum detectable criteria.

It may be noted that acoustic impedance is the product of density and velocity of sound. Assuming that the cornea does not stretch and that the scleral tissue is totally compressible, then there is a linear relationship between scleral density and intraocular pressure. In this case, velocity being constant, the acoustic impedance of the sclera is directly related to intraocular pressure. Thus, this system has the capability of detecting a 5 percent change in intraocular pressure.

While there has been shown and described the preferred embodiments of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:
1. A method for determining the acoustic impedance of the cornea, comprising:
   directing a first acoustic pulse through a first coupling medium, so as to be reflected back from the cornea, said medium having an acoustic impedance which closely approximates that of the eye,
   measuring the reflected energy of said first acoustic pulse;
   directing a second acoustic pulse, substantially identical to said first acoustic pulse, through a second coupling medium having acoustic impedance substantially equal to that of said first coupling medium, so as to be reflected back from a calibrated acoustic impedance;
   measuring the reflected energy of said second acoustic pulse;
   determining the respective paths of said first and second acoustic pulses and the reflections thereof through said first and second coupling mediums, respectively, to be substantially identical;
   detecting and comparing the respective reflected energies of said first acoustic pulse and said second acoustic pulse; and
   selecting said calibrated acoustic impedance to provide that the reflected energy of said second acoustic pulse is equal to the reflected energy of said first acoustic pulse, so as to determine the acoustic impedance of the cornea by comparison.

2. Apparatus for determining the acoustic impedance of the cornea comprising:
   a cup-like member having its open end disposed in sealed relationship to the cornea and containing a first liquid medium therein having an acoustic impedance which approximates that of the eye;
   means including a first transducer in said cup-like member for directing acoustic energy through said first liquid medium against said cornea and receiving reflected energy therefrom as a function of the acoustic impedance of the cornea;
   means including a second transducer disposed in sealed relationship to a calibrated acoustic impedance in a second liquid medium having an acoustic impedance substantially equal to that of said first liquid medium and spaced from said calibrated impedance a distance substantially equal to the distance between said first transducer and said cornea, said second transducer being operative to direct a same acoustic energy through said liquid medium against said calibrated impedance, said calibrated impedance being such as to reflect a same energy therefrom to said second transducer as is received by said first transducer; and
   means for comparing the energy reflected from said calibrated impedance and that reflected from said cornea to said second and first transducers, respectively, whereby the acoustical impedance of the cornea is determined by comparison.

* * * * *